(12) United States Patent
Zhang et al.

(10) Patent No.: US 12,077,446 B2
(45) Date of Patent: Sep. 3, 2024

(54) CATALYTIC SYNTHESIS METHOD, DEVICE AND SYSTEM FOR AMMONIA SYNTHESIS THROUGH ORDERLY REGULATION OF THE ELECTRONIC DOMAIN OF NITROGEN

(71) Applicant: Tianjin University, Tianjin (CN)

(72) Inventors: Baoshun Zhang, Tianjin (CN); Yifu Yu, Tianjin (CN); Bin Zhang, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/219,131

(22) Filed: Jul. 7, 2023

(65) Prior Publication Data
US 2024/0199435 A1 Jun. 20, 2024

(30) Foreign Application Priority Data

Dec. 16, 2022 (CN) .......................... 202211624113.X

(51) Int. Cl.
*C01C 1/04* (2006.01)
*B01J 8/00* (2006.01)
(Continued)

(52) U.S. Cl.
CPC ............. *C01C 1/0411* (2013.01); *B01J 8/001* (2013.01); *B01J 8/008* (2013.01); *B01J 8/065* (2013.01); *B01J 8/067* (2013.01); *B01J 21/12* (2013.01); *B01J 23/78* (2013.01); *C01C 1/0452* (2013.01); *B01J 2208/00407* (2013.01);
(Continued)

(58) Field of Classification Search
CPC .... C01C 1/00; C01C 1/02; C01C 1/04; C01C 1/0405; C01C 1/0411; C01C 1/0447; C01C 1/0452; B01J 8/00; B01J 8/001; B01J 8/008; B01J 8/02; B01J 8/06; B01J 8/065; B01J 8/067; B01J 21/00; B01J 21/12; B01J 23/00; B01J 23/70; B01J 23/76; B01J 23/78; B01J 2208/00; B01J 2208/00008; B01J 2208/00017; B01J 2208/00389; B01J 2208/00407; B01J 2208/00433; B01J 2208/00477; B01J 2208/06; B01J 2208/065
See application file for complete search history.

(56) References Cited

U.S. PATENT DOCUMENTS 10,059,589 B2 * 8/2018 Thevasahayam ...... B01D 53/02
2017/0253492 A1 * 9/2017 Beach ..................... B01J 37/18

FOREIGN PATENT DOCUMENTS

| CN | 102155508 B | 8/2011 |
|---|---|---|
| CN | 104453536 A | 3/2015 |

(Continued)

*Primary Examiner* — Natasha E Young

(57) ABSTRACT

A catalytic synthesis method, a device and a system for ammonia synthesis through orderly regulation of the electronic domain of nitrogen are provided. Nitrogen and hydrogen are used as raw materials, and a multi-composition material with magnetic material as active site is used as a catalyst, thermal field, magnetic field and electric field or thermal field and electromagnetic field are applied to nitrogen, hydrogen and catalyst at the same time. The invention adopts the catalytic synthesis method, device and system for the mild ammonia synthesis at low temperature and low pressure conditions through orderly regulation of the electronic domain of nitrogen.

4 Claims, 5 Drawing Sheets

(51) Int. Cl.
*B01J 8/06* (2006.01)
*B01J 21/12* (2006.01)
*B01J 23/78* (2006.01)

(52) U.S. Cl.
CPC ............ *B01J 2208/00433* (2013.01); *B01J 2208/00477* (2013.01); *B01J 2208/065* (2013.01)

(56) References Cited

FOREIGN PATENT DOCUMENTS

| | | |
|---|---|---|
| CN | 108159581 A | 6/2016 |
| CN | 207032976 U | 2/2018 |
| CN | 111135488 A | 5/2020 |
| CN | 111135490 A | 5/2020 |
| CN | 114344746 A | 4/2022 |
| CN | 216856656 U | 7/2022 |
| JP | 2012116602 A | 6/2012 |
| WO | WO-2019104204 A1 * | 5/2019 ............ B01J 12/007 |

* cited by examiner

CATALYTIC SYNTHESIS METHOD, DEVICE AND SYSTEM FOR AMMONIA SYNTHESIS THROUGH ORDERLY REGULATION OF THE ELECTRONIC DOMAIN OF NITROGEN

CROSS REFERENCE TO THE RELATED APPLICATIONS

This application is based upon and claims priority to Chinese Patent Application No. 202211624113.X, filed on Dec. 16, 2022, the entire contents of which are incorporated herein by reference.

TECHNICAL FIELD

The invention relates to the technical field of ammonia synthesis, in particular to a catalytic synthesis method, device and system for ammonia synthesis through orderly regulation of the electronic domain of nitrogen.

BACKGROUND

Ammonia ($NH_3$) is an extremely important synthetic chemical, it is the foundation of global agriculture and supports the continuous growth of the world population. In recent years, ammonia has been considered as a promising energy storage carrier, hydrogen storage carrier, and clean fuel beyond the conventional application in agricultural production.

The Haber-Bosch process is a globally dominant industrial synthetic ammonia method, known as one of the greatest inventions of the 20th century. The traditional Haber-Bosch process uses fossil fuels as raw materials and energy to produce hydrogen ($H_2$) through fossil fuel reforming technology, and nitrogen ($N_2$) is obtained by air separation technology. The compressed (>200 bar) and heated (490° C.) gas mixtures of nitrogen and hydrogen are catalytically converted into ammonia in a fixed bed reactor filled with an iron-based catalyst. Since the conventional ammonia synthesis process uses fossil fuels as raw materials and energy, carbon emissions are inevitably generated during the production process. According to statistics, the conventional Haber-Bosch ammonia synthesis process emits nearly 2 tons of carbon dioxide gas ($CO_2$) for every ton of ammonia produced, and the global ammonia industry emits up to 400 million tons of carbon dioxide gas per year, indicating that the conventional Haber-Bosch process is an ammonia synthesis technology with high carbon footprint, which means that the ammonia industry is facing a huge challenge of green production upgrading under the 'double carbon' goal.

In the era of large-scale application of renewable energy, the use of clean electricity produced by renewable energy drives water electrolysis for large-scale production of green hydrogen to replace fossil energy with a high carbon footprint for hydrogen production is the key development direction of green ammonia synthesis technology. Using renewable energy to produce hydrogen to replace conventional fossil energy to produce hydrogen is only to optimize the raw material production process. However, the high temperature and high pressure of the ammonia synthesis process do not match the volatility and intermittence of renewable energy, which is a key challenge for the conventional ammonia synthesis industry to become a 100% renewable energy-driven green ammonia synthesis industry.

Ammonia synthesis is a typical reversible reaction, the positive reaction that is expected to occur at the maximum rate is the reaction of nitrogen and hydrogen to produce ammonia, on the contrary, the reverse reaction that occurs at the minimum rate is the reaction of ammonia cracking to produce nitrogen and hydrogen. The positive reaction of ammonia synthesis is an exothermic and volume reduction process, while the reverse reaction is an endothermic and volume expansion process. Therefore, reducing the reaction temperature or increasing the reaction pressure can increase the equilibrium ammonia concentration, while increasing the reaction temperature or reducing the reaction pressure will reduce the equilibrium ammonia concentration. The calculation of chemical thermodynamics shows that when the ratio of nitrogen to hydrogen is 1:3 and the pressure is 15 MPa, the equilibrium ammonia concentrations at 500° C. and 300° C. are 14.86% and 60.84%, respectively, and the latter is four times of the former. When the pressure is 10 MPa, the equilibrium ammonia concentrations at 500° C. and 300° C. are 10.51% and 52.01%, respectively, and the latter is 4.9 times that of the former.

At present, the operating temperature and operating pressure of the conventional synthetic ammonia process are 450-500° C. and 15 MPa, respectively. The actual outlet ammonia concentration of the synthetic ammonia reactor is close to the theoretical value under operating conditions, indicating that the process ceiling is about to be touched. The space for further optimization in the future is very small, and the cost required for optimization will be much higher than the benefits generated by optimization, and will no longer be economical. The actual outlet ammonia concentration of the ammonia synthesis process at low temperatures is far less than the theoretical value. The ceiling of the ammonia synthesis process at low temperatures is high, and there is a large process optimization space. Therefore, the research and development of the catalytic synthesis of ammonia under low-temperature conditions can provide theoretical and practical methods for the further development of the synthetic ammonia industry and will guide the construction of a new synthetic ammonia industrial system.

However, nitrogen is a typical highly inert substance, and its molecular activation energy is very high (941 KJ/mol). In fact, nitrogen can be activated and hydrogenated into ammonia utilizing a catalyst and relatively high-temperature conditions. It is difficult to detect the formation of ammonia by storing nitrogen and hydrogen for several years under normal temperature and pressure and without a catalyst. Because of the best activity temperature range of iron-based catalysts for ammonia synthesis is 450-500° C., the operating temperature of the ammonia synthesis reaction is set at 450-500° C. In order to promote the formation rate of ammonia at high temperatures or to inhibit the reaction rate of ammonia cracking at high temperatures, the operating pressure of the ammonia synthesis reaction is set above 15 MPa.

Compared with high-temperature and high-pressure synthetic ammonia, low-temperature and low-pressure synthetic ammonia has many advantages, such as mild operating conditions, a safer production process, lower production energy consumption, higher matching with volatile renewable energy, and less investment in plant construction. Its technical and economic benefits are very significant, thermal catalytic synthesis, electrocatalytic synthesis, photocatalytic synthesis, and plasma synthesis based on noble metal catalysts have been reported to achieve low-temperature and low-pressure synthesis of ammonia. However, due to the high cost of catalysts, low synthesis efficiency, and low energy efficiency, the industrial application of the above technologies is greatly limited.

SUMMARY

The purpose of the invention is to provide a catalytic synthesis method, device and system for the mild ammonia synthesis at low temperature and low pressure though orderly regulation of the electronic domain of nitrogen.

In order to achieve the above purpose, the invention provides a catalytic synthesis method for ammonia synthesis through orderly regulation of the electronic domain of nitrogen. Nitrogen and hydrogen are used as raw materials, and a multi-composition material with magnetic material as active site is used as a catalyst, thermal field, magnetic field and electric field or thermal field and electromagnetic field are applied to nitrogen, hydrogen and catalyst at the same time.

Preferably, the magnetic substance is comprised with one or several of cobalt, nickel, iron, chromium, manganese, cobalt-nickel, cobalt-iron, cobalt-chromium, cobalt-manganese, nickel-iron, nickel-chromium, nickel-manganese, iron-manganese, chromium-manganese, cobalt-nickel-iron, cobalt-nickel-chromium, cobalt-nickel-manganese, cobalt-iron-chromium, cobalt-iron-manganese, nickel-iron-chromium and nickel-iron-manganese.

Preferably, the magnetic material is in a reduced state, and the magnetic material exists in an oxidized state before reduction; furthermore, the oxidized magnetic material is in-situ reduced to the reduced magnetic material by reacting with raw material hydrogen in the reactor, and the reduced magnetic substance is an active site for ammonia synthesis by catalytic reaction of nitrogen and hydrogen.

Preferably, in addition to active materials, the catalyst also includes a cocatalyst, the cocatalyst is comprised of one or several of silica, titanium oxide, vanadium oxide, magnesium oxide, chromium oxide, alumina, potassium oxide, calcium oxide, zinc oxide, manganese oxide, magnesium aluminate spinel, calcium aluminate, magnesium silicate, calcium silicate, and calcium titanate.

Preferably, the total pressure of nitrogen and hydrogen is 0.1-20 MPa; the total pressure of nitrogen and hydrogen is 5-10 MPa;

the molar ratio of nitrogen to hydrogen is 1:3-3:1; the molar ratio of nitrogen to hydrogen is 1:1-3:1.

Preferably, the temperature of the applied thermal field is 30-390° C.; furthermore, the temperature of the applied thermal field is 200-300° C.; the intensity of the electric field is 0.1-100 kV; furthermore, the intensity of the electric field is 0.1-50 kV; furthermore, the electric field is an alternating electric field, and the waveform of the alternating electric field is superimposed by one or more of the rectangular wave, sine wave, cosine wave, triangular wave, and arbitrary variation function waveform; the frequency of the alternating electric field is 50 Hz-1 MHz, furthermore, the frequency is 1-100 kHz.

The intensity of the magnetic field is 1 Gs-100 T, furthermore, the intensity of the magnetic field is 100 Gs-10 T; furthermore, the magnetic field is an alternating magnetic field, and the waveform of the alternating magnetic field is superimposed by one or more of the rectangular wave, sine wave, cosine wave, triangular wave and arbitrary variation function waveforms, the frequency of the alternating magnetic field is 50 Hz-1 MHz, then preferably, frequency 1-100 kHz.

The intensity of the applied electromagnetic field is 0.1-100 kV, 1 Gs-100 T, and the frequency is 50 Hz-1 MHz, the waveform is superimposed by one or more of the rectangular wave, sine wave, cosine wave, triangular wave, and arbitrary variation function waveforms; furthermore, the intensity of the electromagnetic field is 0.1-50 kV, 100 Gs-10 T, frequency is 50 Hz-1 MHz.

The Synthesis Mechanism of the Invention

According to the theory of thermal catalytic synthesis of ammonia, the outer d-band of the iron atom in iron-based catalysts is the main area where nitrogen and hydrogen molecules interact with each other, in the catalytic process of iron-based catalyst, frontier orbitals of nitrogen and hydrogen chemically adsorb with the d-band of the iron atom in iron catalyst, in particular, the single electron in the pair of electrons in the frontier orbital is filled into the orbital containing lone electron in the d-band of the iron atom, and a transition state Fe—N bond and Fe—H bond are formed on the surface of the catalyst, thus weakening the bond energy of N—N bond and H—H bond of nitrogen molecule and hydrogen molecule, and then the N—N bond and H—H bond are broken and rearranged into N—H bond under the drive of thermal field, and then $NH_3$ molecules are formed on the surface of the catalyst.

Electron domains refer to paired electrons and paired bonding electrons that are not involved in bonding, the state of the electronic domain in the frontier orbitals of nitrogen molecules and hydrogen molecules is the key to determining their chemical activity when nitrogen molecules and hydrogen molecules interact with the d-band of iron atoms in iron catalysts, nitrogen molecules, and hydrogen molecules form bonding electronic domains with the lone electron orbitals in the d-band of iron atoms, respectively, the formation and dissociation of the bonding electronic domains are also important factors affecting the chemical bond rearrangement of nitrogen molecules and hydrogen molecules and the formation rate of $NH_3$ molecules.

Conventional catalytic synthesis is basically driven by heat, the typical feature of thermal catalytic synthesis is disorder, in the thermal field, the movement of electrons in nitrogen molecules, hydrogen molecules, and iron-based catalysts is dominated by disordered movement. When the electric field and the magnetic field exist, the electrons of the material show the law of orderly movement along the spatial direction of the electric field and the magnetic field, therefore, by controlling the electric field and the magnetic field, the movement of the electrons of the material can be regulated in an orderly manner, and then the catalytic synthesis process can be realized, the regulation, that is, with the help of electric field and magnetic field, can regulate the bonding electronic domain of nitrogen molecules and hydrogen molecules and the bonding electronic domain of the two with the active atom d-band of the magnetic catalyst, and then under the premise of constant thermal field, by controlling the electric field and magnetic field, the regulation of the kinetics of the reaction of nitrogen and hydrogen to form ammonia is realized.

In this invention, under the action of the thermal field, magnetic field, and electric field or thermal field and electromagnetic field, the electronic domain of nitrogen molecule and hydrogen molecule in a non-polar state shifts orderly along the direction of the electric field, so that nitrogen molecule and hydrogen molecule change from non-polar state to polar state, and at the same time, the outer electronic domain of catalyst in magnetic neutral state spins orderly along the direction of the magnetic field, so that the catalyst changes from the magnetic neutral state to magnetization state.

By controlling the parameters of the thermal field, electric field and magnetic field or thermal field, or electromagnetic field, the polarization state of nitrogen molecules and hydrogen molecules, the magnetization state of the catalyst, and the adsorption and desorption behavior of the reaction species on the catalyst surface can be regulated.

The polarized nitrogen molecules and hydrogen molecules interact with the magnetized catalyst, nitrogen molecules, and hydrogen molecules are rearranged by chemical bonds at low temperatures to generate ammonia molecules. By controlling the parameters of the electric field and magnetic field or electromagnetic field, the adsorption and desorption equilibrium state of nitrogen, hydrogen, and ammonia on the surface of the catalyst under a single thermal field can be broken, and a non-equilibrium state of adsorption and desorption of nitrogen, hydrogen, and ammonia can be constructed on the surface of the catalyst, so as to improve the reaction rate of nitrogen and hydrogen to form ammonia, so as to achieve the purpose of efficient synthesis of ammonia at low temperature.

By controlling the intensity or frequency or waveform of the electric field, the intensity or frequency or waveform of the magnetic field, and the intensity or frequency or waveform of the electromagnetic field, or controlling the intensity, frequency, or waveform of the electric field, magnetic field, and electromagnetic magnetic field, the polarization state of the nitrogen molecule and the hydrogen molecule and the magnetization state of the catalyst are regulated, furthermore, the polarization direction and polarization degree of the nitrogen molecule and the hydrogen molecule and the magnetization direction and magnetization degree of the catalyst are regulated, and the adsorption and desorption rate of the reaction species on the catalyst surface can be accelerated, which can improve the mass transfer efficiency on the catalyst surface, and furthermore, the rate of ammonia formation by the reaction of nitrogen and hydrogen is increased.

By controlling one or several parameters of the intensity, frequency, and waveform of the electric field, magnetic field, and electromagnetic field, the adsorption and desorption equilibrium of the reaction species on the surface of the catalyst under a constant thermal field can be broken, so that the adsorption rate and desorption rate of the reaction species are in a state of continuous change, a reaction species reaction and adsorption-desorption non-equilibrium state different from the reaction species reaction and adsorption-desorption equilibrium state under a single thermal field are formed on the surface of the catalyst, so as to regulate the kinetics of the reaction of nitrogen and hydrogen to form ammonia under a constant thermal field, and then accelerate the reaction of nitrogen and hydrogen to form ammonia.

A device used in the catalytic synthesis method for ammonia synthesis through orderly regulation of the electronic domain of nitrogen includes an ammonia reactor, the ammonia reactor includes a thermal insulation component, a pressure-bearing shell, a thermal field generating component one, an electric field generating component one, a magnetic field generating component one, or an electromagnetic field generating component one, the thermal insulation component is arranged on the outer surface of the pressure-bearing shell, the pressure-bearing shell is a hollow cylindrical structure, the two ends of the pressure-bearing shell are provided with ellipsoidal heads, the thermal field generating component one is arranged between the thermal insulation component and the pressure-bearing shell or on the inner surface of the pressure-bearing shell or along the axis of the pressure-bearing shell, the electric field generating component one and the magnetic field generating component one are all set inside the pressure-bearing shell.

Preferably, when the thermal field generating component one is arranged between the thermal insulation component and the pressure-bearing shell, its structure is a resistance heating coil or a magnetic induction heating coil or a heat conduction oil heating pipe, or a heating jacket integrated with the pressure-bearing shell; when the thermal field generating component one is set on the inner surface of the pressure-bearing shell, the structure is a resistance heating coil or a magnetic induction heating coil or a heat conduction oil heating pipe; when the thermal field generating component one is set along the axis of the pressure vessel, the structure is a resistance heating straight pipe or a magnetic induction heating straight pipe or a heat conduction oil heating straight pipe;

the electric field generating component one includes a No. 1 electric field generating electrode and a No. 2 electric field generating electrode, the No. 1 electric field generating electrode and the No. 2 electric field generating electrode are both disk structures, the No. 1 electric field generating electrode is set opposite to the No. 2 electric field generating electrode, the gap distance between the No. 1 electric field generating electrode and the No. 2 electric field generating electrode is 1-100 mm; the No. 1 electric field generating electrode and the No. 2 electric field generating electrode are connected to the positive and negative electrodes of a DC power supply or an AC power supply respectively, the outer surfaces of the No. 1 electric field generating electrode and the No. 2 electric field generating electrode are provided with insulating materials, the magnetic catalyst is filled between the No. 1 electric field generating electrode and the No. 2 electric field generating electrode.

Preferably, the electromagnetic field generating component one includes a No. 1 generating electrode and a No. 2 generating electrode, the distance between the No. 1 generating electrode and No. 2 generating electrode is 1-100 mm, the outer surface of the No. 1 generating electrode and No. 2 generating electrode is provided with insulating material, and the magnetic catalyst is filled between the No. 1 generating electrode and the No. 2 generating electrode.

An ammonia synthesis system used in the catalytic synthesis method for ammonia synthesis through orderly regulation of the electronic domain of nitrogen, including an ammonia reactor, a thermal field generating component two, an electric field generating component two, a magnetic field generating component two or an electromagnetic field generating component two, a thermal field measuring instrument, an electric field measuring instrument, a magnetic field measuring instrument, a pressure detector, an ammonia gas analyzer, a hydrogen analyzer, a nitrogen analyzer, a dew point analyzer, a heat exchanger, a heater, a compressed nitrogen gas source, a compressed hydrogen gas source, a gas mixer, a compressor, a cooler, and a liquid ammonia storage tank;

the thermal field generating component two is connected with the thermal field generating component one of the ammonia reactor, the electric field generating component two is connected with the electric field generating component one of the ammonia reactor, the electromagnetic field generating component two is connected with the magnetic field generating component one of the ammonia reactor;

the thermal field measuring instrument includes multiple temperature measuring probes, the magnetic field measuring instrument includes multiple magnetic field measuring probes, the pressure detector includes multiple pressure probes, temperature measuring probes, magnetic field measuring probes, and the pressure probes are set at the magnetic catalyst bed of the ammonia reactor, the electric field measuring instrument includes multiple electric field measuring probes, the electric field measuring probe is set on the cable between the electric field generating component two and the electric field generating component one;

the ammonia gas analyzer is connected to a raw material input pipeline and a syngas output pipeline of the ammonia reactor through the pipeline, the hydrogen analyzer is connected with the compressed hydrogen gas source, the nitrogen analyzer is connected with the compressed nitrogen gas source, an inlet end of the heat exchanger is connected with the syngas output pipeline of the ammonia reactor, the compressed nitrogen gas source and the compressed hydrogen gas source are connected with the gas mixer through the pipeline, the gas mixer is connected with an inlet end of the heat exchanger through the pipeline, an inlet end of the heat exchanger is connected with the heater, the heater is connected with the raw material input pipeline of the ammonia reactor, and the outlet end of the heat exchanger is connected with the cooler.

The Beneficial Effects of the Invention (1) The catalytic synthesis method, device and system for ammonia synthesis through orderly regulation of the electronic domain of nitrogen in the invention realize the efficient catalytic conversion of nitrogen on the surface of the cheap catalyst under low-temperature conditions by using the electronic domain ordered regulation technology, it solves the problem that nitrogen is difficult to be activated efficiently under low-temperature conditions and realizes the mild synthesis of ammonia under low temperature and low-pressure conditions.

(2) The catalytic synthesis method for ammonia synthesis through orderly regulation of the electronic domain of nitrogen, under the action of a constant thermal field at low temperature, the polarization state of nitrogen molecule and hydrogen molecule and the magnetization state of magnetic catalyst are regulated by controlling the electric field and magnetic field or electromagnetic field, so that the nitrogen molecule and hydrogen molecule are changed from non-polar state to polar molecule, and the magnetic catalyst is changed from magnetic neutral state to magnetization state. The polarization degree of the nitrogen molecule, hydrogen molecule, and the magnetization degree of the magnetic catalyst increase with the increase of electric field strength and magnetic field strength, so as to improve the activation degree of the nitrogen molecule, hydrogen, and catalyst at low temperature, realize the efficient synthesis of ammonia at low temperature, and make the synthesis rate of ammonia at low temperatures higher than that of traditional ammonia synthesis process, therefore, the method of this invention has a large-scale industrial application value.

(3) The catalytic synthesis method, device and system for ammonia synthesis through orderly regulation of the electronic domain of nitrogen in the invention can not only greatly reduce the initial investment cost and the later operation cost of the synthesis plant, but also improve the intrinsic safety of the plant, and greatly improve the production efficiency and reduce the energy consumption of unit synthetic ammonia.

(4) The catalytic synthesis method, device and system for ammonia synthesis through orderly regulation of the electronic domain of nitrogen in the invention have strong feasibility of reactor and system. The thermal field, electric field, and magnetic field of the catalyst bed can be regulated by setting the thermal field generating component, the electric field generating component, and the magnetic field generating component in the pressure vessel and adjusting the structure and positioning of the component and the parameters of the power supply. Under different temperature and pressure conditions, the optimal outlet ammonia concentration can be obtained by regulating the electric field, magnetic field, or electromagnetic field of the catalyst bed, and the unit energy consumption can be controlled at the most reasonable level. The power supply, detector, analyzer, heater, heat exchanger, and other instruments and equipment supporting the reactor are industrial products, which can support the construction of the system and the large-scale application of the method.

(5) The catalytic synthesis method, device and system for ammonia synthesis through orderly regulation of the electronic domain of nitrogen in the invention can be directly matched with renewable energy power sources such as solar power generation and wind power generation and non-sustainable renewable energy can be stored in ammonia in the form of chemical energy, so as to solve the problem of large-scale storage and transportation of renewable energy and long-term continuous use, thus promoting the large-scale application of renewable energy and accelerating the realization of the 'double carbon' goal.

(6) The catalytic synthesis method, device and system for ammonia synthesis through orderly regulation of the electronic domain of nitrogen in the invention can realize the efficient synthesis of ammonia under mild conditions of low temperature and low pressure, therefore, it is also suitable for the development of miniaturized synthetic ammonia device matching distributed renewable energy power supply, which can provide nitrogen fertilizer and liquid energy for farms, rural areas, isolated islands, polar regions and extraterrestrial space. The application scenarios are diverse and the development prospects are bright.

The following is a further detailed description of the technical solution of the invention through drawings and embodiments.

Figure 1:
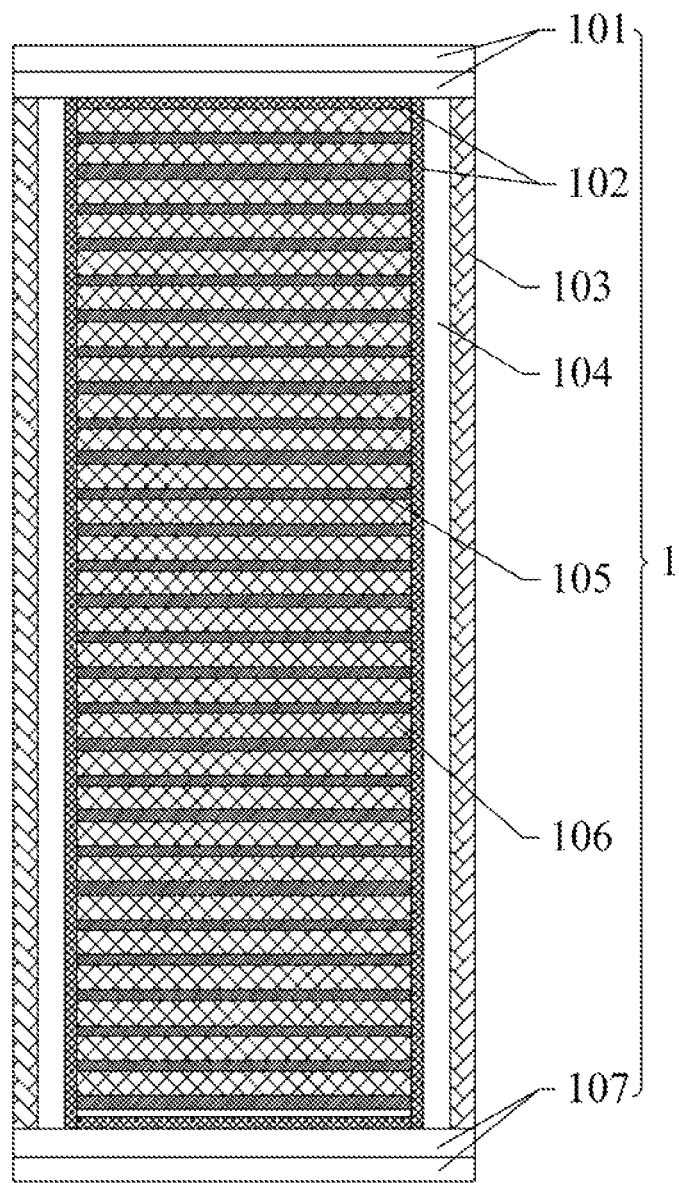
FIG. 1 is the profile of the ammonia reactor of the catalytic synthesis method for ammonia synthesis through orderly regulation of the electronic domain of nitrogen.
Figure 2:
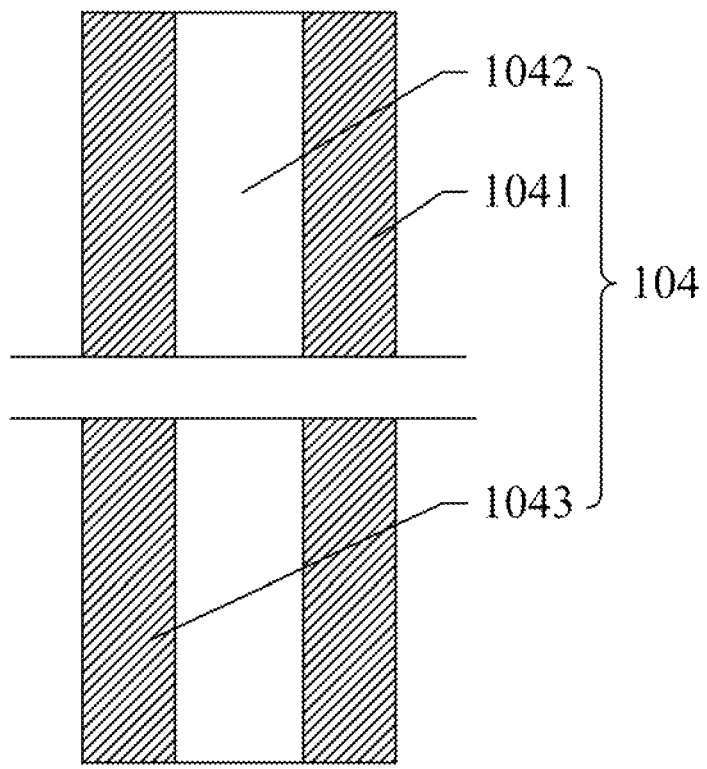
FIG. 2 is a local schematic diagram of the pressure-bearing shell of the ammonia reactor of the invention.
Figure 3:
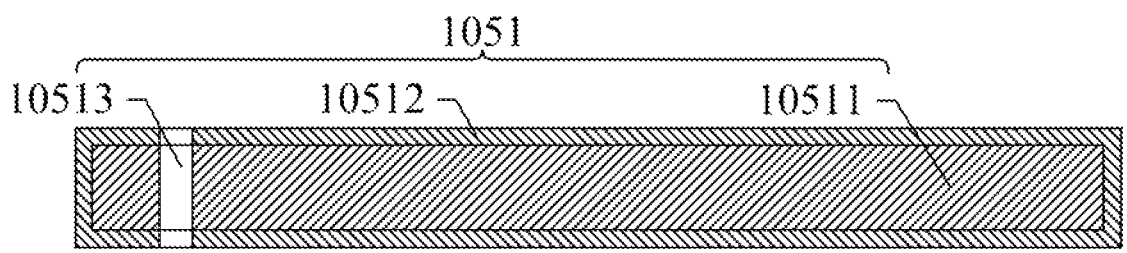
FIG. 3 is the profile of the No. 1 generating electrode of the ammonia reactor of this invention.
Figure 4:
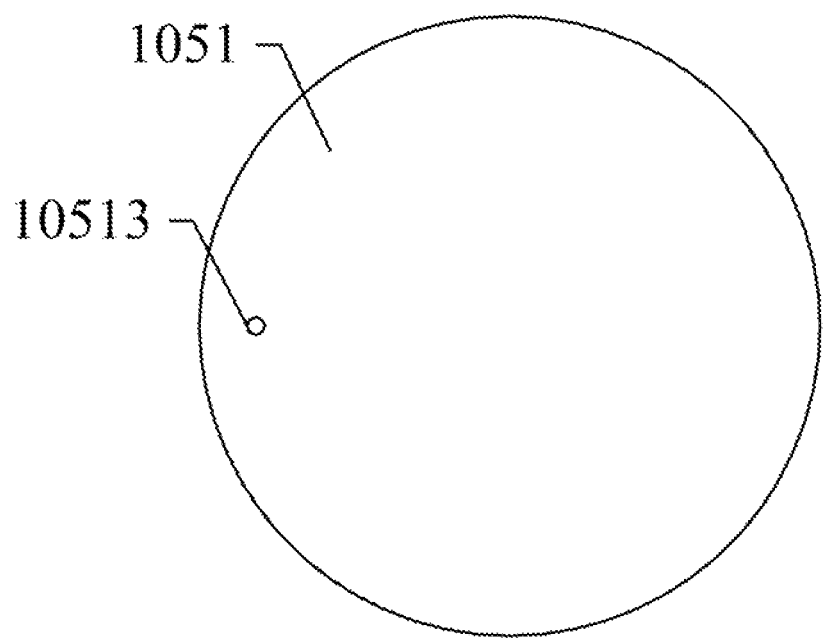
FIG. 4 is the top view of the No. 1 generating electrode of the ammonia reactor of the invention.
Figure 5:
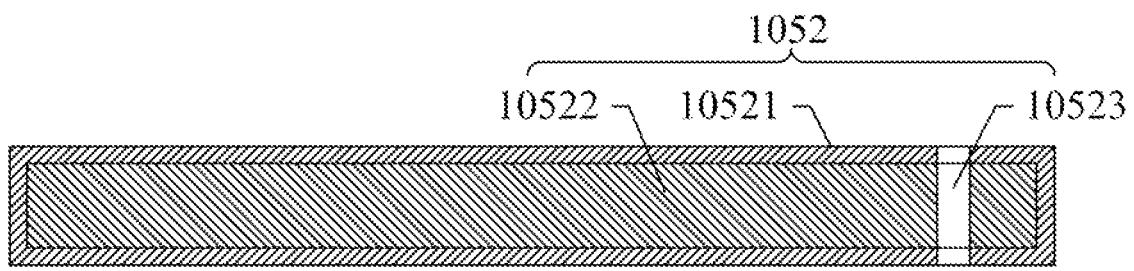
FIG. 5 is the profile of the No. 2 generating electrode of the ammonia reactor of this invention.
Figure 6:
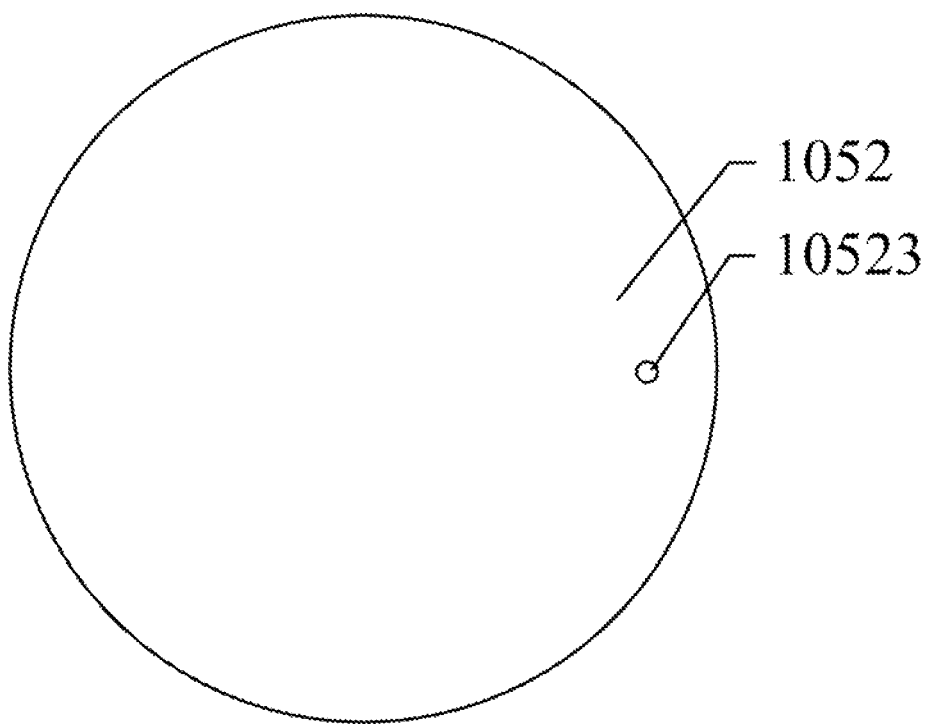
FIG. 6 is the top view of the No. 2 generating electrode of the ammonia reactor of the invention.
Figure 7:
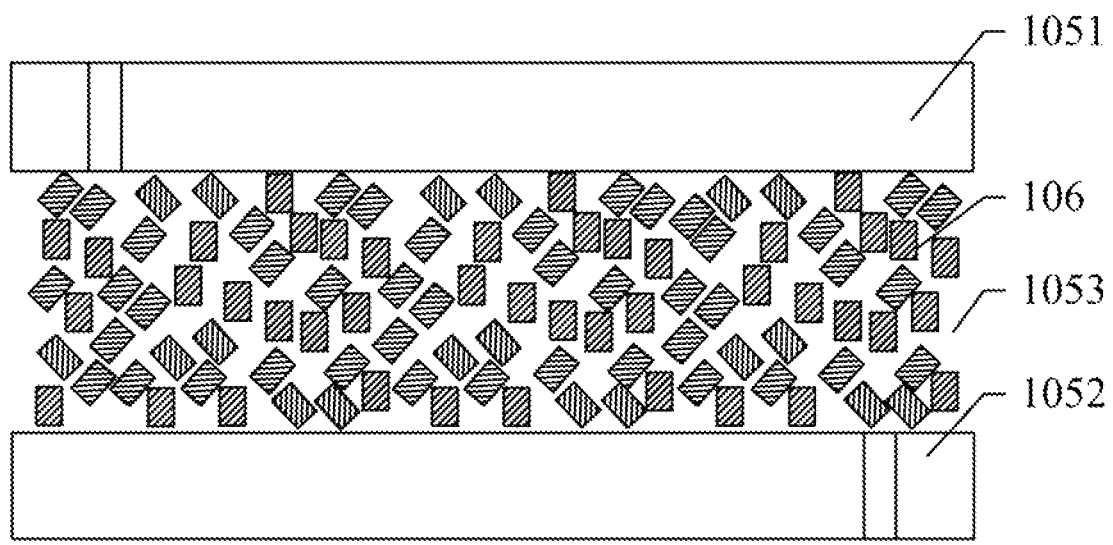
FIG. 7 is the coordination diagram of the No. 1 generating electrode and the No. 2 generating electrode of the ammonia reactor of the invention.

TAGS IN THE FIGURES 1, ammonia reactor; 101, upper head; 102, electrical insulation layer; 103, thermal insulation component; 104, pressure-bearing shell; 1041, outer wall of the reactor; 1042, inner wall of the reactor; 1043, heat conduction oil chamber;
105, electromagnetic field generating component one;
1051, No. 1 generating electrode; 10511, electrical insulation layer one; 10512, metal plate one; 10513, gas channel one;
1052, No. 2 generating electrode; 10521, electrical insulation layer two; 10522, metal plate one; 10523, gas channel two; 1053, magnetic catalyst cavity; 106, magnetic catalyst; 107, lower head;
2, thermal field generating component two; 3, electromagnetic field generating component two; 4, thermal field measuring instrument; 5, dew point analyzer; 6, electric field measuring instrument; 7, magnetic field measuring instrument; 8, pressure detector; 9, ammonia gas analyzer; 10, heat exchanger; 11, cooler; 12, liquid ammonia storage tank; 13, compressor; 14, heater; 15, compressed nitrogen gas source; 16, compressed hydrogen gas source; 17, gas mixer; 18, nitrogen analyzer; 19, hydrogen analyzer.

DETAILED DESCRIPTION OF THE EMBODIMENTS

The invention is further described in combination with the embodiments in the following. All chemicals and reagents used in the embodiments are purchased from the market without special explanation.

The invention provides a catalytic synthesis method for ammonia synthesis through orderly regulation of the electronic domain of nitrogen. Nitrogen and hydrogen are used as raw materials, and a multi-component material with magnetic substance as active component is used as a catalyst, thermal field, magnetic field and electric field or thermal field and electromagnetic field are applied to nitrogen, hydrogen and catalyst at the same time.

Preferably, the magnetic substance is one or several components of cobalt, nickel, iron, chromium, manganese, cobalt nickel, cobalt iron, cobalt chromium, cobalt manganese, nickel iron, nickel chromium, nickel manganese, iron manganese, chromium manganese, cobalt nickel iron, cobalt nickel chromium, cobalt nickel manganese, cobalt iron chromium, cobalt iron manganese, nickel iron chromium and nickel iron manganese.

Preferably, the magnetic substance is in a reduced state, and the magnetic substance exists in an oxidized state before reduction; furthermore, the oxidized magnetic substance is in-situ reduced to the reduced magnetic substance by the reaction raw material hydrogen in the reactor, and the reduced magnetic substance is an active component of the nitrogen catalytic hydrogenation synthesis ammonia reaction.

Preferably, in addition to active materials, the catalyst also includes a cocatalyst, the cocatalyst is one or several components of silica, titanium oxide, vanadium oxide, magnesium oxide, chromium oxide, alumina, potassium oxide, calcium oxide, zinc oxide, manganese oxide, magnesium aluminate spinel, calcium aluminate, magnesium silicate, calcium silicate, and calcium titanate.

Preferably, the total pressure of nitrogen and hydrogen is 0.1-20 MPa; the total pressure of nitrogen and hydrogen is 5-10 MPa;
the molar ratio of nitrogen to hydrogen is 1:3-3:1; the molar ratio of nitrogen to hydrogen is 1:1-3:1.

Preferably, the temperature of the applied thermal field is 30-390° C.; furthermore, the temperature of the applied thermal field is 200-300° C.;
the intensity of the electric field is 0.1-100 kV; furthermore, the intensity of the electric field is 0.1-50 kV; furthermore, the electric field is an alternating electric field, and the waveform of the alternating electric field is superimposed by one or more of the rectangular wave, sine wave, cosine wave, triangular wave, and arbitrary variation function waveform; the frequency of the alternating electric field is 50 Hz-1 MHz, furthermore, the frequency is 1-100 KHz.

The intensity of the magnetic field is 1 Gs-100 T, furthermore, the intensity of the magnetic field is 100 Gs-10 T; furthermore, the magnetic field is an alternating magnetic field, and the waveform of the alternating magnetic field is superimposed by one or more of the rectangular wave, sine wave, cosine wave, triangular wave and arbitrary variation function waveforms, the frequency of the alternating magnetic field is 50 Hz-1 MHz, then preferably, frequency 1-100 kHz.

The intensity of the applied electromagnetic field is 0.1-100 kV, 1 Gs-100 T, and the frequency is 50 Hz-1 MHz, the waveform is superimposed by one or more of the rectangular wave, sine wave, cosine wave, triangular wave, and arbitrary variation function waveforms; furthermore, the intensity of the electromagnetic field is 0.1-50 kV, 100 Gs-10 T, frequency is 50 Hz-1 MHz.

A device used in the catalytic synthesis method for ammonia synthesis through orderly regulation of the electronic domain of nitrogen includes ammonia reactor 1, ammonia reactor 1 includes thermal insulation component 103, pressure-bearing shell 104, a thermal field generating component one, an electric field generating component one, a magnetic field generating component one, or electromagnetic field generating component one 105, thermal insulation component 103 is arranged on the outer surface of pressure-bearing shell 104, which is used for heat preservation of ammonia reactor 1, pressure-bearing shell 104 is a hollow cylindrical structure, the two ends of pressure-bearing shell 104 are provided with ellipsoidal heads, upper head 101 is located at the upper end of pressure-bearing shell 104, lower head 107 is located at the lower end of pressure-bearing shell 104, pressure-bearing shell 104 is metal material, and the pressure limit is 15 MPa. Furthermore, the material of pressure-bearing shell 104 is carbon steel.

The thermal field generating component one is arranged between thermal insulation component 103 and pressure-bearing shell 104 or on the inner surface of pressure-bearing shell 104 or along the axis of pressure-bearing shell 104. When the thermal field generating component one is arranged between the thermal insulation component and the pressure-bearing shell, its structure is a resistance heating coil or a magnetic induction heating coil or a heat conduction oil heating pipe or a heating jacket integrated with pressure-bearing shell 104; when the thermal field generating component one is set on the inner surface of pressure-bearing shell 104, the structure is a resistance heating coil or a magnetic induction heating coil or a heat conduction oil heating pipe; when the thermal field generating component one is set along the axis of the pressure vessel, the structure is a resistance heating straight pipe or a magnetic induction heating straight pipe or a heat conduction oil heating straight pipe.

The electric field generating component one and the magnetic field generating component one are both set inside pressure-bearing shell 104.

The electric field generating component one includes a No. 1 electric field generating electrode and a No. 2 electric field generating electrode, the No. 1 electric field generating electrode and the No. 2 electric field generating electrode are both disk structures, the No. 1 electric field generating electrode is set opposite to the No. 2 electric field generating electrode, the gap distance between the No. 1 electric field generating electrode and the No. 2 electric field generating electrode is 1-100 mm; the No. 1 electric field generating electrode and the No. 2 electric field generating electrode have a composite structure, which is composed of metal materials inside and insulating materials outside, the insulating materials are silicon oxide, alumina, silicon nitride, titanium oxide, and magnesium oxide. There are also multiple through holes on the No. 1 electric field generating electrode and the No. 2 electric field generating electrode.

The No. 1 electric field generating electrode and the No. 2 electric field generating electrode are connected to the positive and negative electrodes of a DC power supply or an AC power supply respectively, then a constant electric field or a variable electric field is created between the two plates. Magnetic catalyst 16 is filled between the No. 1 electric field generating electrode and the No. 2 electric field generating electrode. The No. 1 electric field generating electrode and the No. 2 electric field generating electrode are both used as a minimum unit to replicate the same gap along the axial direction of pressure-bearing shell 104. At this time, the electric field generating plate is alternately connected with the positive and negative electrodes of the DC power supply or the AC power supply, and then the constant electric field or the variable electric field in the opposite direction is created in the gap filled with adjacent magnetic catalyst 16. Furthermore, by controlling the angle between the electric field generating plate and the axis of pressure-bearing shell 104 and the rotation angle between the electric field generating plate and the axis of pressure-bearing shell 104, the spatial direction of the electric field existing between the electric field generating plates can be regulated.

The magnetic field generating component one is a coil structure or a straight tube structure, which is made of metal and is set along the axis of pressure-bearing shell 104. When the magnetic field generating component one is a coil structure or a straight tube structure and the thermal field generating component one is driven by electric power, the magnetic field generating component one is the same as the thermal field generating component one. When the component is connected to DC or AC, the component creates a constant magnetic field or a variable magnetic field, and the direction of the magnetic field is judged according to Abe's rule. Furthermore, the spatial direction of the magnetic field can be controlled by controlling the angle between the axis of the component and the axis of pressure-bearing shell 104 and the rotation angle between the axis of the component and the axis of pressure-bearing shell 104.

In addition to using an independent electric field generating component one and a magnetic field generating component one to create an electric field and a magnetic field with specific parameters, an electromagnetic field generating component one 105 can also be used to create a coupled electromagnetic field that satisfies both electric and magnetic field parameters. Electromagnetic field generation component 105 includes No. 1 generating electrode 1051 and a No. 2 generating electrode. Furthermore, No. 1 generating electrode 1051 is pressure-bearing shell 104, and the No. 2 generating electrode is a metal cylindrical rod set along the axis of pressure-bearing shell 104. The distance between No. 1 generating electrode 1051 and the No. 2 generating electrode is 1-100 mm. The outer surface of No. 1 generating electrode 1051 and the No. 2 generating electrode is also provided with the above insulation material. No. 1 generating electrode 1051 and the No. 2 generating electrode are filled with magnetic catalyst 16. The No. 1 generating electrode 1051 and the No. 2 generating electrode are connected to the two electrodes of the AC power supply respectively, and a coupling body of electric field and magnetic field is formed in the gap between the first electrode 1051 and the second electrode.

An ammonia synthesis system used in the catalytic synthesis method for ammonia synthesis through orderly regulation of the electronic domain of nitrogen, including ammonia reactor 1, thermal field generating component two 2, an electric field generating component two, a magnetic field generating component two or electromagnetic field generating component two 3, thermal field measuring instrument 4, electric field measuring instrument 6, magnetic field measuring instrument 7, pressure detector 8, ammonia gas analyzer 9, hydrogen analyzer 19, nitrogen analyzer 18, dew point analyzer 5, heat exchanger 10, heater 14, compressed nitrogen gas source 15, compressed hydrogen gas source 16, gas mixer 17, compressor 13, cooler 11 and a liquid ammonia storage tank 12; thermal field generating component two 2 is connected with the thermal field generating component one of ammonia reactor 1, the electric field generating component two is connected with the electric field generating component one of ammonia reactor 1, electromagnetic field generating component two 3 is connected with the magnetic field generating component one of ammonia reactor 1.

Thermal field measuring instrument 4 includes multiple temperature measuring probes, multiple temperature measuring probes are set at the magnetic catalyst bed of ammonia reactor 1 to measure the temperature of the magnetic catalyst bed in different spatial regions of ammonia reactor 1. Magnetic field measuring instrument 7 includes multiple magnetic field measuring probes, multiple magnetic field measuring probes are set at the magnetic catalyst bed of ammonia reactor 1 to measure the magnetic field parameters of the magnetic catalyst bed in different spatial regions of ammonia reactor 1. Pressure detector 8 includes multiple pressure probes, and multiple magnetic field measuring probes are set at the magnetic catalyst bed of ammonia reactor 1 to measure the pressure of the magnetic catalyst bed in different spatial regions of ammonia reactor 1.

Electric field measuring instrument 6 contains multiple electric field measuring probes. The electric field measuring probe is arranged on the cable between the electric field generating component 2 and the electric field generating component 1 to measure the electric field parameters of the magnetic catalyst located in different spatial areas of ammonia reactor 1. The electric field measuring instrument 6 and the magnetic field measuring instrument 7 can measure the coupling body parameters of the electric field and magnetic field at the magnetic catalyst bed in the same setting method.

Ammonia gas analyzer 9 is connected to the raw material input pipeline and syngas output pipeline of ammonia reactor 1 through the pipeline to analyze and detect the ammonia content in raw materials and syngas in real time. Hydrogen analyzer 19 is connected with compressed hydrogen gas source 16 for real-time analysis and detection of the purity of fresh hydrogen raw materials. Nitrogen analyzer 18 is connected with compressed nitrogen gas source 15 for real-time analysis and detection of the purity of fresh nitrogen gas source.

An inlet end of heat exchanger 10 is connected with the syngas output pipeline of ammonia reactor 1, compressed nitrogen gas source 15 and compressed hydrogen gas source 16 are connected with the gas mixer 17 through the pipeline, gas mixer 17 is connected with an inlet end of heat exchanger 10 through the pipeline, the syngas in heat exchanger 10 exchanges heat with compressed nitrogen and compressed hydrogen mixture to preheat the fresh raw material gas.

One inlet end of heat exchanger 10 is connected to heater 14 to heat the preheated fresh raw material gas. Heater 14 is connected to the raw material input pipeline of ammonia reactor 1. The heated raw material gas is transported to ammonia reactor 1 through the pipeline from heater 14. The outlet end of heat exchanger 10 is connected to cooler 11. After the heat-exchanged syngas is cooled by cooler 11, the ammonia gas is condensed into liquid ammonia and transported to liquid ammonia storage tank 12 for storage, the unreacted nitrogen and hydrogen in the syngas are sent to compressor 13 for pressurization, and then heated by heater 14 and transported to ammonia reactor 1 for recycling together with fresh raw material gas.

Embodiment 1

As shown in FIGS. 1-7, a device used in the catalytic synthesis method for ammonia synthesis through orderly regulation of the electronic domain of nitrogen, including ammonia reactor 1 consists of upper head 101, electrical insulation layer 102, insulation layer 103, pressure-bearing shell 104, electromagnetic field generating component 105, magnetic catalyst 106 and lower head 107. Pressure-bearing shell 104 consists of outer wall of reactor 1041, inner wall of reactor 1042, and heat conduction oil chamber 1043. The minimum unit of the electromagnetic field generating component composed of No. 1 generating electrode 1051 and No. 2 generating electrode 1052 is repeatedly set according to the same gap. Magnetic catalyst 106 is filled in magnetic catalyst cavity 1053 between No. 1 generating electrode 1051 and No. 2 generating electrode 1052. No. 1 generating electrode 1051 consists of electrical insulation layer one 10511, metal plate 10512 and gas channel 10513, No. 2 generating electrode 1052 is composed of electrical insulation layer 10521, metal plate 10522 and gas channel 10523.

Embodiment 2

Figure 8:
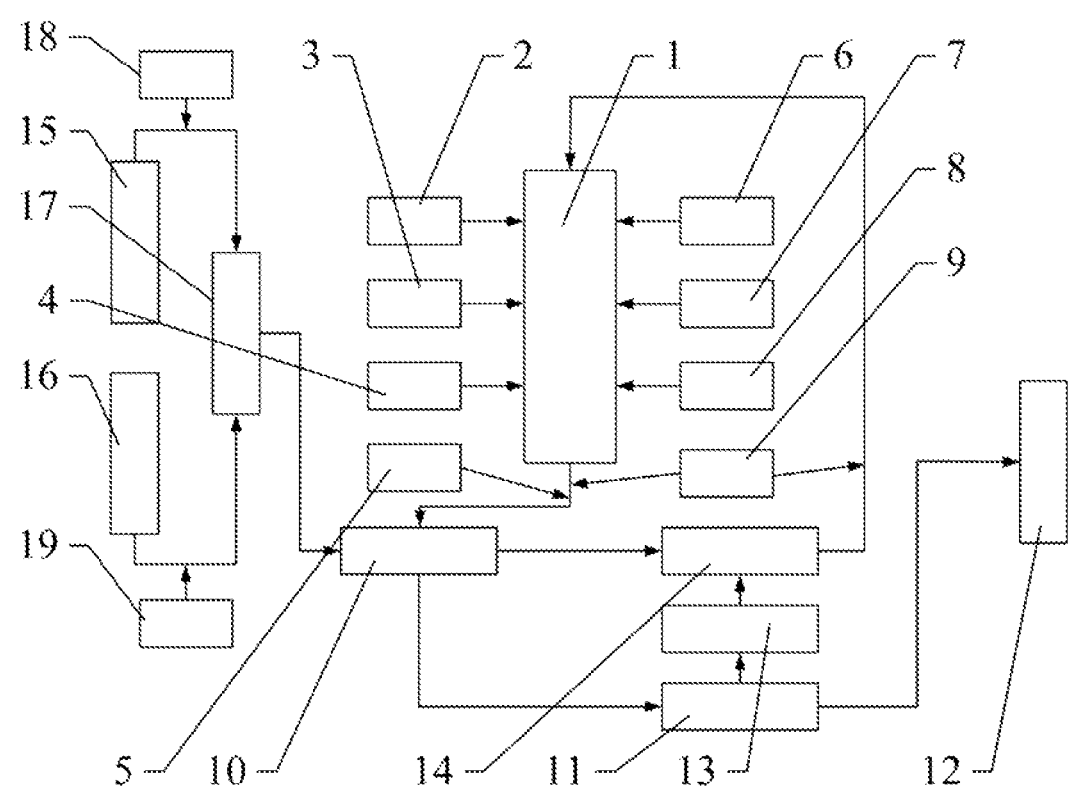
FIG. 8 is an ammonia synthesis system used in the catalytic synthesis method for ammonia synthesis through orderly regulation of the electronic domain of nitrogen.

As shown in FIG. 8, an ammonia synthesis system used in the catalytic synthesis method for ammonia synthesis through orderly regulation of the electronic domain of nitrogen, including ammonia reactor 1, thermal field generating component two 2, an electric field generating component two, a magnetic field generating component two or electromagnetic field generating component two 3, thermal field measuring instrument 4, electric field measuring instrument 6, magnetic field measuring instrument 7, pressure detector 8, ammonia gas analyzer 9, hydrogen analyzer 19, nitrogen analyzer 18, dew point analyzer 5, heat exchanger 10, heater 14, compressed nitrogen gas source 15, compressed hydrogen gas source 16, a gas mixer 17, a compressor, cooler 11 and liquid ammonia storage tank 12; the thermal field generating component two is connected with the thermal field generating component one of ammonia reactor 1, the electric field generating component two is connected with the electric field generating component one of ammonia reactor 1, the magnetic field generating component two 3 is connected with the magnetic field generating component one of ammonia reactor 1.

Thermal field measuring instrument 4 includes multiple temperature measuring probes, magnetic field measuring instrument 7 includes multiple magnetic field measuring probes, pressure detector 8 includes multiple pressure probes, temperature measuring probes, magnetic field measuring probes, the pressure probes are set at the magnetic catalyst bed of ammonia reactor 1, electric field measuring instrument 6 includes multiple electric field measuring probes, the electric field measuring probe is set on the cable between the electric field generating component two and the electric field generating component one.

Ammonia gas analyzer 9 is connected to a raw material input pipeline and a syngas output pipeline of ammonia reactor 1 through the pipeline, hydrogen analyzer 19 is connected with the compressed hydrogen gas source 16, nitrogen analyzer 18 is connected with compressed nitrogen gas source 15, an inlet end of heat exchanger 10 is connected with the syngas output pipeline of ammonia reactor 1, compressed nitrogen gas source 15 and compressed hydrogen gas source 16 are connected with gas mixer 17 through the pipeline, gas mixer 17 is connected with an inlet end of heat exchanger 10 through the pipeline, an inlet end of heat exchanger 10 is connected with heater 14, heater 14 is connected with the raw material input pipeline of ammonia reactor 1, and the outlet end of heat exchanger 10 is connected with cooler 11.

Embodiment 3

Nitrogen and hydrogen were used as raw materials, and multielement material of $Fe/Co_3O_4/Al_2O_3/SiO_2/K_2O/CaO$ was used as catalyst, thermal field, magnetic field, and electric field were applied to nitrogen, hydrogen and catalyst simultaneously, or thermal field and electromagnetic field were applied simultaneously. The total pressure of nitrogen and hydrogen was 1 MPa; the molar ratio of nitrogen to hydrogen was 1:3, the temperature of thermal field was 350° C.; the intensity of electric field was 10 kV (10 kHz); the intensity of the magnetic field was 100 Gs (10 kHz). The actual ammonia concentration at the outlet is shown in Table 1.

Embodiment 4

Nitrogen and hydrogen were used as raw materials, and multielement material of $Fe/Co_3O_4/Al_2O_3/SiO_2/K_2O/CaO$ was used as catalyst, thermal field, magnetic field, and electric field were applied to nitrogen, hydrogen and catalyst simultaneously, or thermal field and electromagnetic field were applied simultaneously. The total pressure of nitrogen and hydrogen was 1 MPa; the molar ratio of nitrogen to hydrogen was 1:3, the temperature of thermal field was 250°

C.; the intensity of electric field was 10 kV (10 kHz); the intensity of the magnetic field was 100 Gs (10 kHz). The actual ammonia concentration at the outlet is shown in Table 1.

Embodiment 5

Nitrogen and hydrogen were used as raw materials, and multielement material of $Fe/Co_3O_4/Al_2O_3/SiO_2/K_2O/CaO$ was used as catalyst, thermal field, magnetic field, and electric field were applied to nitrogen, hydrogen and catalyst simultaneously, or thermal field and electromagnetic field were applied simultaneously. The total pressure of nitrogen and hydrogen was 1 MPa; the molar ratio of nitrogen to hydrogen was 1:3, the temperature of thermal field was 350° C.; the intensity of electric field was 22 kV (10 kHz); the intensity of the magnetic field was 196 Gs (10 kHz). The actual ammonia concentration at the outlet is shown in Table 1.

Embodiment 6

Nitrogen and hydrogen were used as raw materials, and multielement material of $Fe/Co_3O_4/Al_2O_3/SiO_2/K_2O/CaO$ was used as catalyst, thermal field, magnetic field, and electric field were applied to nitrogen, hydrogen and catalyst simultaneously, or thermal field and electromagnetic field were applied simultaneously. The total pressure of nitrogen and hydrogen was 5 MPa; the molar ratio of nitrogen to hydrogen was 1:3, the temperature of thermal field was 250° C.; the intensity of electric field was 22 kV (10 kHz); the intensity of the magnetic field was 196 Gs (10 kHz). The actual ammonia concentration at the outlet is shown in Table 1.

Comparison Case 1

Nitrogen and hydrogen were used as raw materials, and multielement material of $Fe/Co_3O_4/Al_2O_3/SiO_2/K_2O/CaO$ was used as catalyst, and only thermal field was applied to nitrogen, hydrogen, and catalyst. The total pressure of nitrogen and hydrogen was 1 MPa; the molar ratio of nitrogen to hydrogen was 1:3, the temperature of thermal field was 350° C. The actual ammonia concentration at the outlet is shown in Table 1.

Comparison Case 2

Nitrogen and hydrogen were used as raw materials, and multielement material of $Fe/Co_3O_4/Al_2O_3/SiO_2/K_2O/CaO$ was used as catalyst, and only thermal field was applied to nitrogen, hydrogen, and catalyst. The total pressure of nitrogen and hydrogen was 1 MPa; the molar ratio of nitrogen to hydrogen was 1:3, the temperature of thermal field was 250° C. The actual ammonia concentration at the outlet is shown in Table 1.

Comparison Case 3

Nitrogen and hydrogen were used as raw materials, and multielement material of $Fe/Co_3O_4/Al_2O_3/SiO_2/K_2O/CaO$ was used as catalyst, and only thermal field was applied to nitrogen, hydrogen, and catalyst. The total pressure of nitrogen and hydrogen was 1 MPa; the molar ratio of nitrogen to hydrogen was 1:3, the temperature of thermal field was 400° C. The actual ammonia concentration at the outlet is shown in Table 1.

Comparison Case 4

Nitrogen and hydrogen were used as raw materials, and multielement material of $Fe/Co_3O_4/Al_2O_3/SiO_2/K_2O/CaO$ was used as catalyst, and only thermal field was applied to nitrogen, hydrogen, and catalyst. The total pressure of nitrogen and hydrogen was 5 MPa; the molar ratio of nitrogen to hydrogen was 1:3, the temperature of thermal field was 350° C. The actual ammonia concentration at the outlet is shown in Table 1.

Comparison Case 5

Nitrogen and hydrogen were used as raw materials, and multielement material of $Fe/Co_3O_4/Al_2O_3/SiO_2/K_2O/CaO$ was used as catalyst, and only thermal field was applied to nitrogen, hydrogen, and catalyst. The total pressure of nitrogen and hydrogen was 5 MPa; the molar ratio of nitrogen to hydrogen was 1:3, the temperature of thermal field was 400° C. The actual ammonia concentration at the outlet is shown in Table 1.

Table 1 the actual ammonia concentrations at the outlet in Embodiments 3-6 and Comparison cases 1-5.

| Items | Thermal field temperature ° C. | Gas pressure MPa | Electric field intensity kV | Magnetic field intensity Gs | Ammonia concentration % |
|---|---|---|---|---|---|
| Embodiment 3 | 350 | 1 | 10 | 100 | 0.81 |
| Embodiment 4 | 250 | 1 | 10 | 100 | 0.01 |
| Embodiment 5 | 350 | 5 | 22 | 196 | 13.73 |
| Embodiment 6 | 250 | 5 | 22 | 196 | 1.92 |
| Comparison case 1 | 350 | 1 | / | / | 0.1 |
| Comparison case 2 | 250 | 1 | / | / | 0 |
| Comparison case 3 | 400 | 1 | / | / | 0.26 |
| Comparison case 4 | 350 | 5 | / | / | 9.78 |
| Comparison case 5 | 400 | 5 | / | / | 10.67 |

It can be seen from Table 1 that the ammonia concentration of catalytic ammonia synthesis by orderly regulation of electronic domain is significantly higher than that of ammonia synthesis without electric field and magnetic field at the same temperature and pressure by comparing Embodiment 3 with Comparison case 1, Embodiment 4 with Comparison case 2, and Embodiment 5 with Comparison case 4. It can be seen that the activation degree of nitrogen molecules, hydrogen molecules and catalysts can be effectively improved by applying electric field and magnetic field at low temperatures, and the synthesis of ammonia can be promoted.

By comparing Comparison cases 1-5, when the temperature reaches 400° C. at a lower pressure, the ammonia concentration synthesized is still relatively low. After increasing the pressure, the ammonia concentration increases, but it is still less than the ammonia concentration obtained by Embodiment 5 of the invention. Moreover, after the temperature rises, the theoretical equilibrium ammonia concentration will decrease, and there is little room for improvement. The theoretical equilibrium concentration of ammonia is high at low temperatures, the invention increases the ammonia concentration by keeping the temperature at a low value and applying an electric field and a magnetic field that does not affect the thermal field.

Finally, it should be explained that the above embodiments are only used to explain the technical solution of the invention rather than restrict it. Although the invention is described in detail regarding the better embodiments, the ordinary technical personnel in this field should understand that they can still modify or replace the technical solution of the invention, and these modifications or equivalent substitutions cannot make the modified technical solution out of the spirit and scope of the technical solution of the invention.

What is claimed is:

1. A catalytic synthesis device for ammonia synthesis through orderly regulation of the electronic domain of nitrogen, including an ammonia synthesis reactor, the ammonia synthesis reactor includes a thermal insulation component, a pressure-bearing shell, a thermal field generating component one, an electromagnetic field generating component one, the thermal insulation component is arranged on an outer surface of the pressure-bearing shell, the pressure-bearing shell is a hollow cylindrical structure, two ends of the pressure-bearing shell are provided with ellipsoidal heads, the thermal field generating component one is arranged between the thermal insulation component and the pressure-bearing shell or on an inner surface of the pressure-bearing shell or along the axis of the pressure-bearing shell, the electromagnetic field generating component one is set inside the pressure-bearing shell;

the electromagnetic field generating component one includes a No. 1 generating electrode and a No. 2 generating electrode, the distance between the No. 1 generating electrode and No. 2 generating electrode is 1-100 mm, the No. 1 generating electrode and the No. 2 generating electrode are used as a minimum unit to replicate a gap along an axial direction of the pressure shell, an outer surface of the No. 1 generating electrode and No. 2 generating electrode is provided with insulating material, and a magnetic catalyst is filled between the No. 1 generating electrode and the No. 2 generating electrode.

2. A catalytic synthesis device for the ammonia synthesis through orderly regulation of the electronic domain of nitrogen according to claim 1, wherein the magnetic material is comprised of one or several of cobalt, nickel, iron, chromium, manganese, cobalt-nickel, cobalt-iron, cobalt-chromium, cobalt-manganese, nickel-iron, nickel-chromium, nickel-manganese, iron-manganese, chromium-manganese, cobalt-nickel-iron, cobalt-nickel-chromium, cobalt-nickel-manganese, cobalt-iron-chromium, cobalt-iron-manganese, nickel-iron-chromium and nickel-iron-manganese.

3. A catalytic synthesis device for the ammonia synthesis through orderly regulation of the electronic domain of nitrogen according to claim 1, wherein when the thermal field generating component one is arranged between the thermal insulation component and the pressure-bearing shell, its structure is a resistance heating coil or a magnetic induction heating coil or a heat conducting oil heating pipe or a heating jacket integrated with the pressure-bearing shell; wherein when the thermal field generating component one is set on the inner surface of the pressure-bearing shell, the structure is a resistance heating coil or a magnetic induction heating coil or a heat conduction oil heating pipe and when the thermal field generating component one is set along the axis of a pressure vessel, the structure is a resistance heating straight pipe or a magnetic induction heating straight pipe or a heat conduction oil heating straight pipe.

4. A catalytic synthesis method for the ammonia synthesis using the device according to claim 1, the method comprising:

using nitrogen and hydrogen as raw materials, and a multi-composition material with magnetic material-in a reduced state, using active materials and a cocatalyst as catalyst, wherein the cocatalyst is one or several components of silica, titanium oxide, vanadium oxide, magnesium oxide, chromium oxide, alumina, potassium oxide, calcium oxide, zinc oxide, manganese oxide, magnesium aluminate spinel, calcium aluminate, magnesium silicate, calcium silicate, and calcium titanate;

a total pressure of nitrogen and hydrogen is 0.1-20 MPa;

a molar ratio of nitrogen to hydrogen is 1:3-3:1;

a temperature of the thermal field is 30-390° C.;

an intensity of applied electromagnetic field is 0.1-100 kV, 1Gs-100T, and a frequency is 50 Hz-1 MHz; and a waveform is one or several superpositions of rectangular wave, sine wave, cosine wave, triangle wave and arbitrary variation function waveforms.

* * * * *